United States Patent
Tachibana et al.

(10) Patent No.: US 6,755,562 B2
(45) Date of Patent: Jun. 29, 2004

(54) ILLUMINATING APPARATUS FOR IMAGE PROCESSING TYPE MEASURING MACHINES

(75) Inventors: Shunsaku Tachibana, Kawasaki (JP); Sadayuki Matsumiya, Sagamihara (JP); Kenji Okabe, Yokohama (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/379,459

(22) Filed: Mar. 4, 2003

(65) Prior Publication Data

US 2003/0169601 A1 Sep. 11, 2003

(30) Foreign Application Priority Data

Mar. 5, 2002 (JP) ........................................ 2002-059531

(51) Int. Cl.$^7$ ................................................. F21V 7/04
(52) U.S. Cl. ........................ 362/551; 362/552; 362/583
(58) Field of Search ............................... 362/551, 552, 362/554, 556, 583; 351/200, 205, 206; 355/1, 37, 35

(56) References Cited

U.S. PATENT DOCUMENTS 3,825,335 A * 7/1974 Reynolds ...................... 355/1
5,689,602 A    11/1997 Arai
6,075,558 A     6/2000 Tachibana et al.
6,142,629 A * 11/2000 Adel et al. .................. 351/206

FOREIGN PATENT DOCUMENTS

GB           0 317 361      *  5/1989  ............. H04N/1/46

* cited by examiner

*Primary Examiner*—Alan Cariaso
*Assistant Examiner*—Mark Tsidulko
(74) *Attorney, Agent, or Firm*—Rankin, Hill, Porter & Clark LLP (57) ABSTRACT

An illuminating apparatus for image processing type measuring machines that is capable of coping with a wide diversity of objects to be measured to enable accurate imaging the object and rarely unable to meet any space restrictions is provided. This illuminating apparatus the light to the object to be measured so as to enable determination of the size and shape of the object on the basis of an image of the same thereby obtained, and includes light sources; a plurality of optical fibers receiving the light sent out from the light sources at one of their ends, outputting the light from their output ends toward the object and divided at their incident ends into at least three groups; and, red, green and blue color filters inserted between the incident ends of the optical fiber groups and the light sources.

4 Claims, 6 Drawing Sheets

ILLUMINATING APPARATUS FOR IMAGE PROCESSING TYPE MEASURING MACHINES

BACKGROUND OF THE INVENTION

1. Field of the Invention

The present invention generally relates to an illuminating apparatus for an image processing type measuring machine adapted to determine the size and shape of an object material on the basis of an image thereof obtained by an optical system, and more particularly to an illuminating apparatus for an image processing type measuring machine adapted to picture, in a striking contrast, not only an object having a stepped portion but also one without steps and instead having differently colored regions, for example, multicolored printed matter (printed patterns etc.), by varying the color of the light applied to the object.

2. Description of the Related Art

In an image processing type measuring machine adapted to optically image a portion of an object and determine the size and shape of the object on the basis of the image thus obtained, for example a microscope, a projector, or a three-dimensional image measuring machine, the illumination of the object to be measured plays an important role in obtaining an image of the object.

Besides a vertically downward illuminating system irradiating the object to be measured from substantially right above the object, a diagonal illuminating system irradiating the object in a direction inclined at a predetermined angle with respect to the axis of an optical system, and a system irradiating through the object to be measured from a position substantially under the object are known as illuminating apparatuses for image processing type measuring machines.

A halogen lamp (white light) has heretofore been used generally as a light source for these illuminating systems. However, when the illuminating light is white light, it is difficult in some cases to detect edges of the object due to the diversity of the objects to be measured. For example, where the object to be measured is a printed pattern, such as printed matter having a plurality of colors, the printed pattern does not have a stepped portion but rather only has different colors, so that the detection of edges of regions of different colors is difficult in some cases.

On the other hand, there is a case where an illuminating apparatus uses an LED (light-emitting diode) as a light source. Even with LED's, however, the color is fundamentally limited, so that the problem of edge detection cannot always be solved. Moreover, the LED device itself is large. Therefore, even when LED's of different colors are arranged with varied light applied to the object to be measured, non-uniformity of the color distribution is liable to occur, and the object to be measured cannot be pictured clearly.

When arranging a multiplicity of LED's is difficult for space reasons, a problem with the brightness of illumination also arises in some cases.

SUMMARY OF THE INVENTION

The present invention has been made in view of these circumstances, and provides an illuminating apparatus for image processing type measuring machines capable of solving the above problems encountered in related art apparatuses of this kind. Machines incorporating an illuminating apparatus of the present invention cope with the diversity of objects to be measured, accurately obtain an image of the object to be measured, and rarely have problems with space limitations.

The illuminating apparatus for image processing type measuring machines according to the present invention that realizes the above features applies light to an object to be measured in order to determine the size and shape of the material on the basis of the image obtained by this irradiation operation. The apparatus includes a light source, a plurality of optical fibers, and a plurality of color filters. The optical fibers have incident ends, which are adapted to receive light that is sent out from the light source, and output ends, from which light is output toward the object to be measured. The optical fibers are divided at their incident ends into at least three groups. The plurality of color filters include red, green, and blue color filters inserted, respectively, between the incident ends of the optical fiber groups and the light source.

In such a structure, red, green and blue light is sent out from the optical fibers in each respective optical fiber group toward the object to be measured. Therefore, the color of the light applied to the object material can be changed to the desired color by changing the quantity of the light radiated from the light source into each optical fiber group. Accordingly, this illuminating apparatus can cope with the diversity of the objects to be measured, i.e., this apparatus can be applied to not only an object having a stepped portion but also to a material without a stepped portion but instead having differently colored regions. The apparatus makes it possible to accurately obtain images of these objects. Moreover, since the object and light source are connected by optical fibers they can be separated from each other and, thus, the apparatus rarely has design problems when there are space limitations.

In this structure, separate light sources are provided for each of the optical fiber groups and it is preferable that the respective light sources be formed so that the brightness of the light therefrom can be regulated. When the apparatus is formed in this manner, the light applied to the object material can be changed to any desired color by regulating the brightness of the light from the respective light sources provided to the optical fiber groups. Therefore, the changing of the colors can be done easily and with a simple structure.

It is preferable that the light output ends of the optical fibers be arranged annularly at an angle so that the optical axes of the optical fibers converge on one point. When the apparatus is formed in this manner, the portion of the object to be measured is irradiated with light from positions all around this portion and in a diagonal direction. This enables the boundary of regions of different colors in the object to be imaged accurately.

In this apparatus, the light output ends of the optical fibers can (a) be arranged in a ring with the color output from each fiber or each group of two or more adjacent fibers being different from that of neighboring ones, (b) be arranged in a ring divided into zones, with each zone outputting one color different from the other zones, (c) be arranged into concentric rings each outputting only one color, the fibers outputting one color all grouped into one ring.

When the structure (a) is employed, red, green and blue light is applied to the object to be measured from all along the ring of annularly arranged light output ends of the optical fibers since the optical fibers adapted to output the light of different colors are alternatingly arranged along a circle. Therefore, even when an obstacle exists in one direction, a shaded region does not occur on the object material. Accordingly, an illuminating operation without causing substantial non-uniformity of the color of an image of an object material can be attained.

When the structure (b) is employed, the arrangement of optical fibers along the circle can be carried out easily, and the cost of manufacturing the illuminating apparatus can be reduced since groups of optical fibers adapted to output the light of each color are all positioned in respective sections of the circle.

When the structure (c) is employed, illumination of an object at high brightness can be attained since groups of optical fibers adapted to output the light of different colors are arranged, respectively, in at least three rings in a concentric manner.

Another illuminating apparatus for image processing type measuring machines according to the present invention applies the light to the object to be measured, enabling determination of the size and shape of the object material on the basis of the object image obtained thereby. The apparatus includes a light source, a plurality of optical fibers receiving light from this light source from one of the ends of the fibers and output the light from their output ends toward the object, and a filter change-over unit inserted in a position between the light source and the ends of the optical fibers facing the light source. The filter change-over unit includes a plurality of color filters and is adapted to switch between different color filters.

When one of the colored filters is in front of the incident ends of the optical fibers with the filter change-over unit operated suitably in the illuminating apparatus having such a construction, the colored light corresponding to the color of the filter that is set is obtained. In this structure, a single light source serves the purpose, and, moreover, the optical fibers need not be divided into groups. This enables the illuminating apparatus to be manufactured easily at a low cost.

BRIEF DESCRIPTION OF THE DRAWINGS

The preferred embodiments of the present invention will be described with reference to the following figures, wherein.

DESCRIPTION OF THE PREFERRED EMBODIMENTS

The present invention will now be described in detail by taking up preferred embodiments of the illuminating apparatus for image processing type measuring machines according to the invention and with reference to the attached drawings. In the following description, the same or equivalent constituent parts of the embodiments will be designated by the same reference numerals, and the description of such parts will thereby be omitted or simplified.

Figure 1:
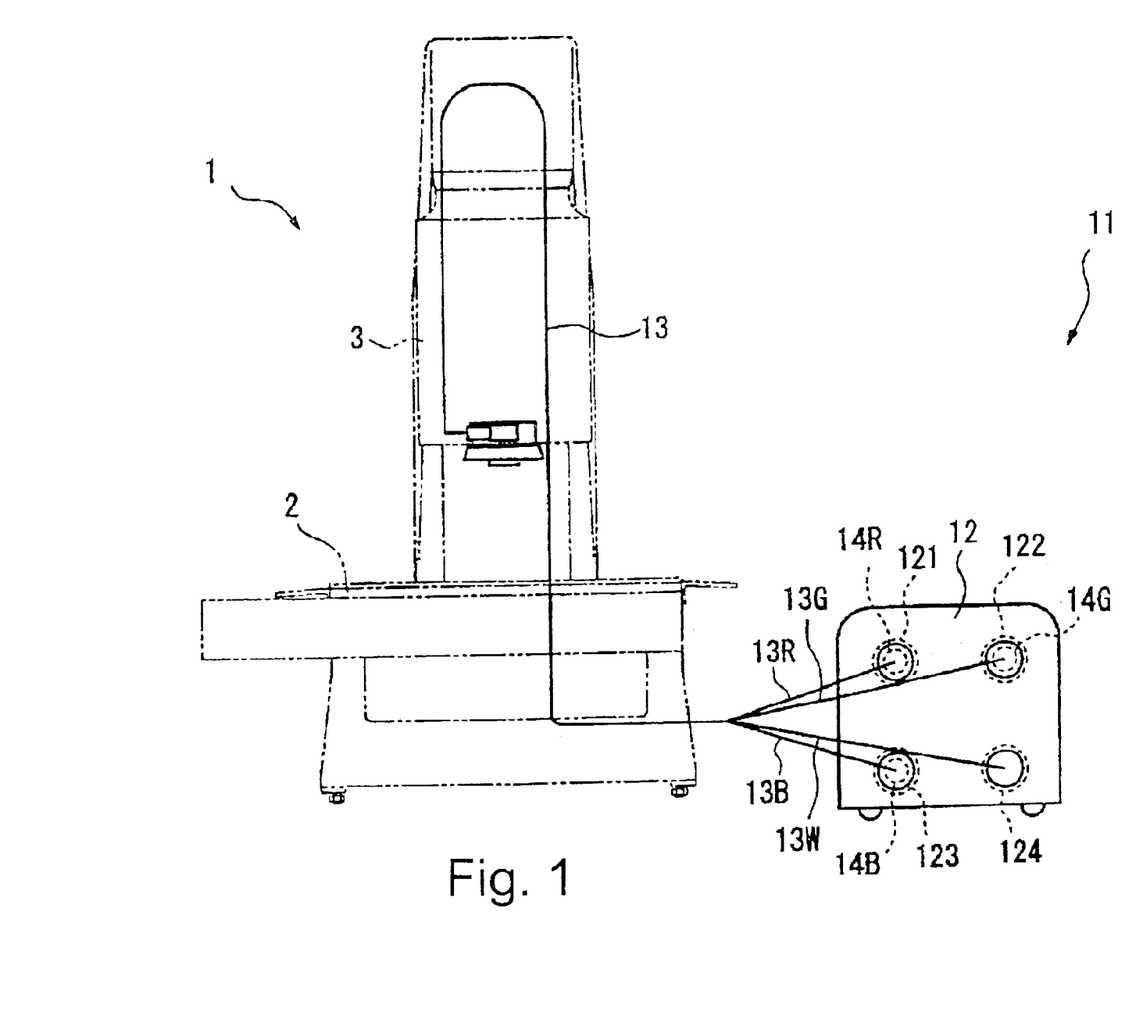
FIG. 1 is a front elevational view showing an image processing type measuring machine to which a first embodiment of the present invention is applied.

FIG. 1 is a front view showing an image processing type measuring machine to which a first embodiment is applied. The image processing type measuring machine to which a first embodiment is applied is provided with an image processing type measuring machine main unit 1 and an illuminating apparatus 11.

The image processing measuring machine main unit 1 is provided with a stage 2 on which the object to be measured is placed, and an optical system 3 for taking an image of the object to be measured, which is placed on the stage 2, and adapted to determine the size and shape of the object on the basis of the image thereof obtained by the optical system 3.

The illuminating apparatus 11 is provided with a light source unit 12 and optical fibers 13, which are divided into four groups 13R, 13G, 13B, 13W in this embodiment. The optical fibers 13 receive light from the light source unit 12 at their incident ends and output the light from their output ends toward the object to be measured. Color filters 14R, 14G, 14B of red (R), green (G), blue or bluish purple (B) are inserted between the incident ends of three of the optical fiber groups 13R, 13G, and 13B and the light source unit 12. Between the fourth optical fiber group 13W and light source unit 12, a filter is not inserted (the light from the light source is introduced as it is into the optical fiber group 13W).

The light source unit 12 has light sources 121, 122, 123, 124 corresponding to the optical fiber groups 13R, 13G, 13B, 13W. Each of the light sources 121, 122, 123, 124 is made of a white light emitting halogen lamp so that the brightness of the light can be regulated by a brightness regulating device (not shown).

Figure 2:
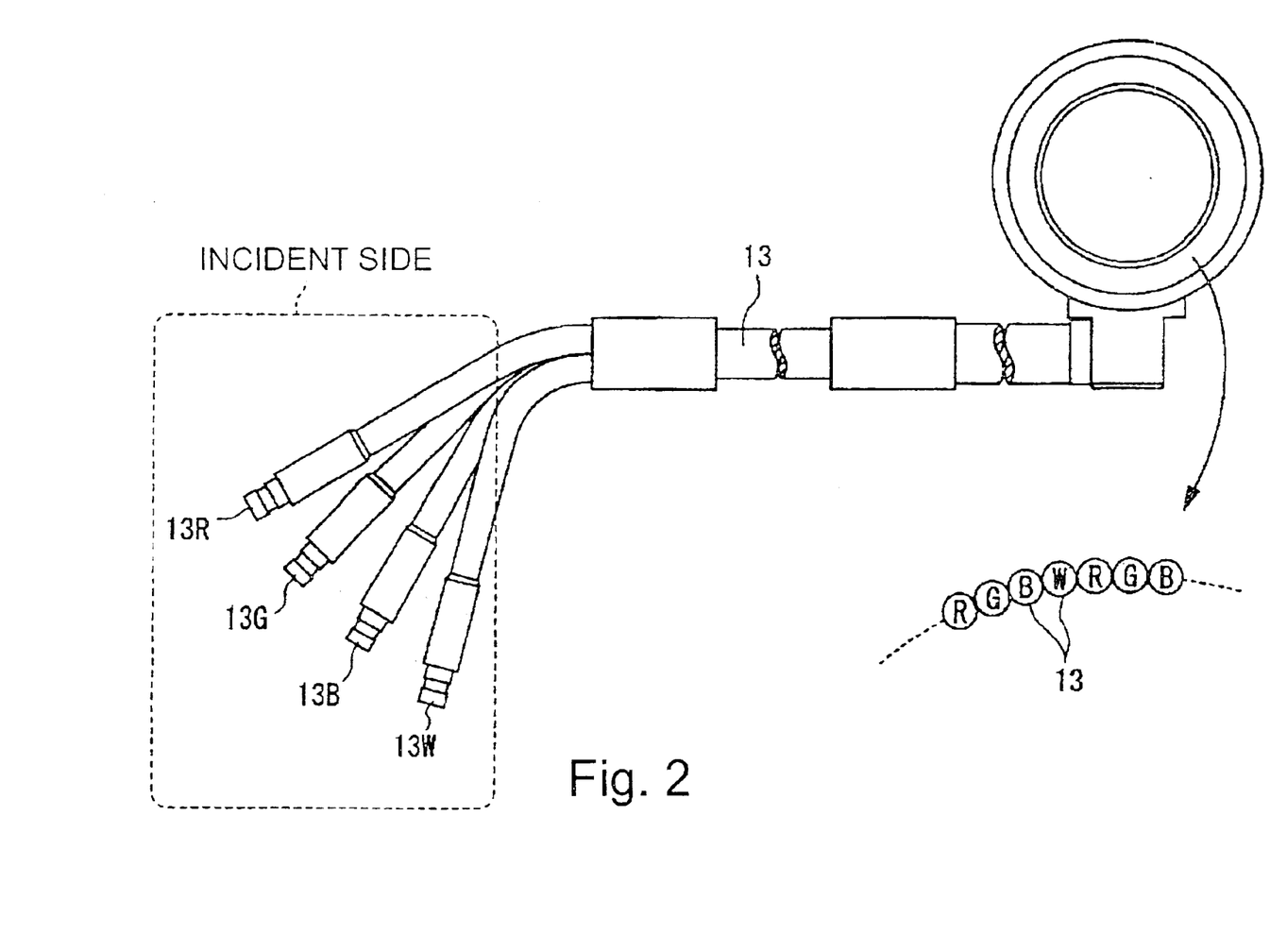
FIG. 2 is a bottom plan view of the first embodiment of the illuminating apparatus according to the present invention.
Figure 3:
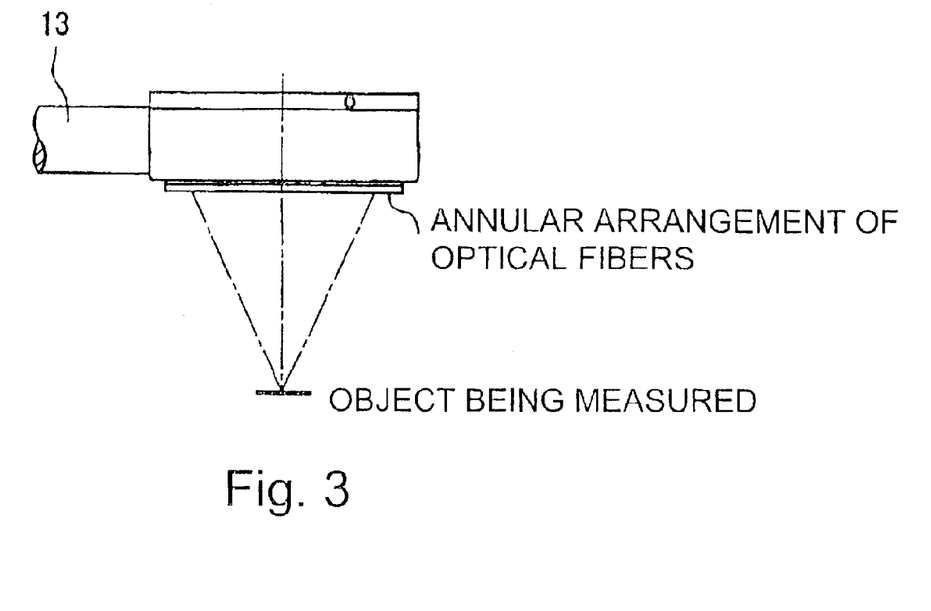
FIG. 3 is a front elevational view of the first embodiment of the illuminating apparatus according to the present invention.

As shown in FIGS. 2 and 3, the light output ends of the optical fibers 13 are arranged annularly so that the optical axes of the optical fibers converge at an angle on one point. In this arrangement, the output ends of the optical fibers 13 are arranged in a predetermined order alternately along a circle. Namely, optical fibers 13 (one optical fiber 13 each of optical fibers 13R, 13G, 13B, 13W) adapted to output the light of R (red), G (green), B (Blue or Bluish Purple), W (White), respectively, are arranged in this order of color repeatedly along a circle.

In such an arrangement, the red light, green light, blue or bluish purple light and white light is sent out from each optical fiber group 13R, 13G, 13B, 13W toward the object to be measured. Therefore, the color of the light applied to the material to be measured can be changed to an arbitrary color by regulating the brightness of the light from the light sources 121, 122, 123, 124 corresponding to each optical fiber group 13R, 13G, 13B, and 13W. Accordingly, the illuminating apparatus can cope with a diversity of objects to be measured. Namely, the illuminating apparatus can be applied to not only an object having a stepped portion but also an object not having a stepped portion but having differently colored regions. This enables images of these object materials to be taken accurately, and enables the changing of colors thereof to be done by a simple construction and, moreover, with ease.

Furthermore, the object to be measured and the light source unit 12 are connected through the optical fibers 13 and so can be widely separated. Therefore, the illuminating apparatus is rarely kept from operating due to space restrictions.

Since the light output ends of the optical fibers 13 are arranged annularly so that the optical axes of the optical fibers converge at an angle on one point, the light is applied to the portion of the object to be measured from positions surrounding the object, and also in the diagonal direction. This enables edges of differently colored regions of the object material to be imaged clearly.

Since optical fibers 13 adapted to output the light of different colors are arranged in alternating order, red, green, and blue light is applied from points all along the circumference of a circular line to the object material. Therefore, even when there is an obstacle in one direction, there is no shadow on the object, so that uniform illumination of the object can be attained.

The optical fibers 13 in the first embodiment are arranged so that optical fibers outputting the light of each color alternate with each fiber repeatedly along the circle. The optical fibers 13 may also be arranged so that several optical fibers 13 outputting the light of each color are arranged together in groups, these groups alternating repeatedly along the circle. For example, the optical fibers 13 may be arranged by setting adjacently two optical fibers 13R outputting R (red) light, then two optical fibers 13G outputting G (green) light, and thereafter two optical fibers 13B outputting B (blue or bluish purple) light, and finally two optical fibers 13W outputting W (white) light, and so on.

In the first embodiment, a filter of a color other than R (red), G (green) and B (blue or bluish purple) may be inserted between the optical fiber group 13W and the light source 124.

Figure 4:
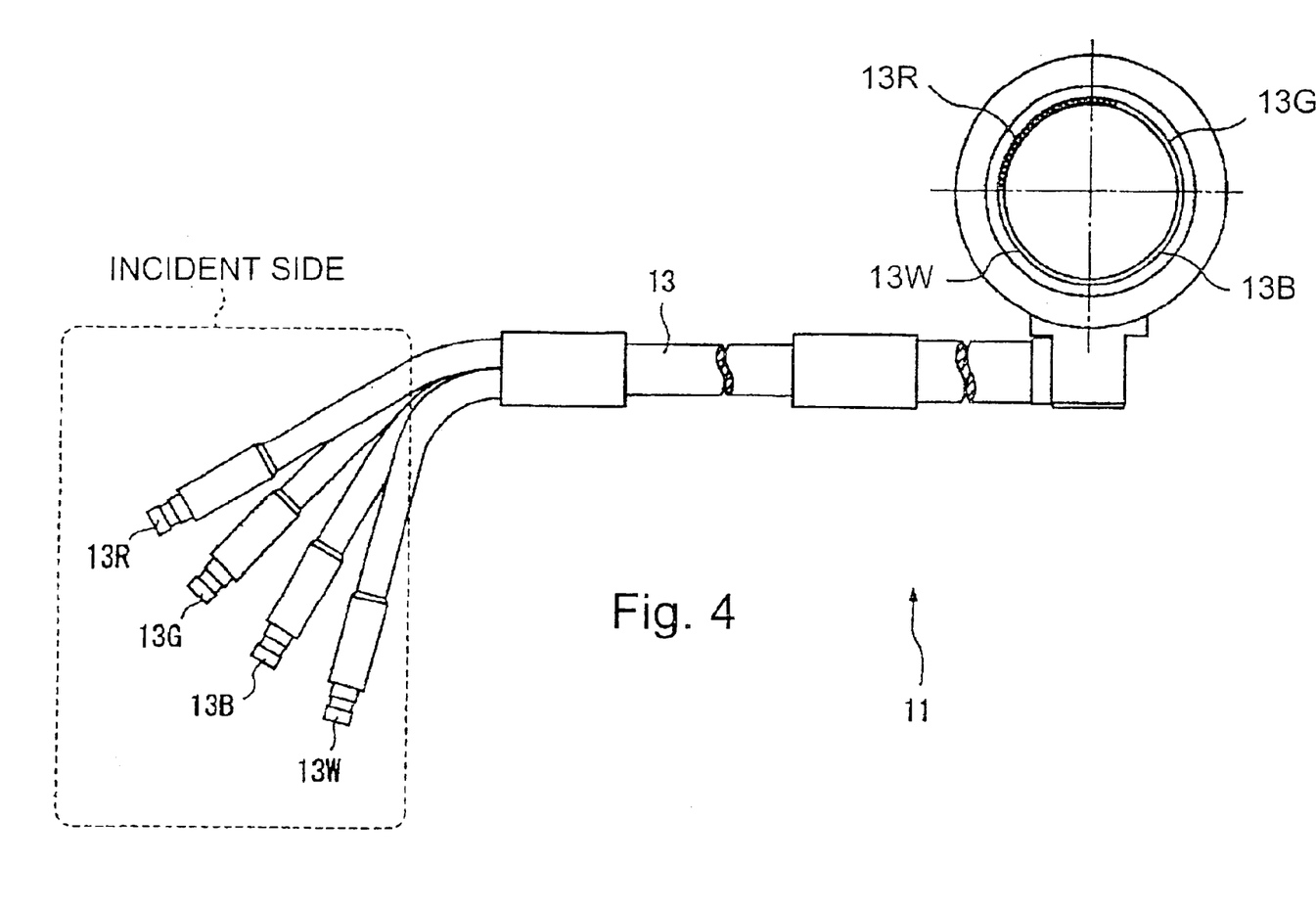
FIG. 4 is a bottom plan view of a second embodiment of the illuminating apparatus according to the present invention.

FIG. 4 shows a second embodiment of the illuminating apparatus according to the present invention. The illuminating apparatus 11 in the second embodiment of the present invention is different from that of the first embodiment in the arrangement of the light output ends of the optical fibers 13. Namely, groups of optical fibers 13 outputting the light of the four different colors 13R, 13G, 13B, and 13W in the second embodiment are arranged so that the fibers outputting each color are all together, forming 4 predetermined sections (each of which extends within a range of 90 degrees), i.e. four quarters of the circle.

In such a structure, in which the optical fiber groups 13R, 13G, 13B, 13W adapted to output the light of different colors are arranged in predetermined sections, the operation for arranging the optical fibers 13 can be carried out easily, and the cost of manufacturing the illuminating apparatus can be reduced to a low level.

Figure 5:
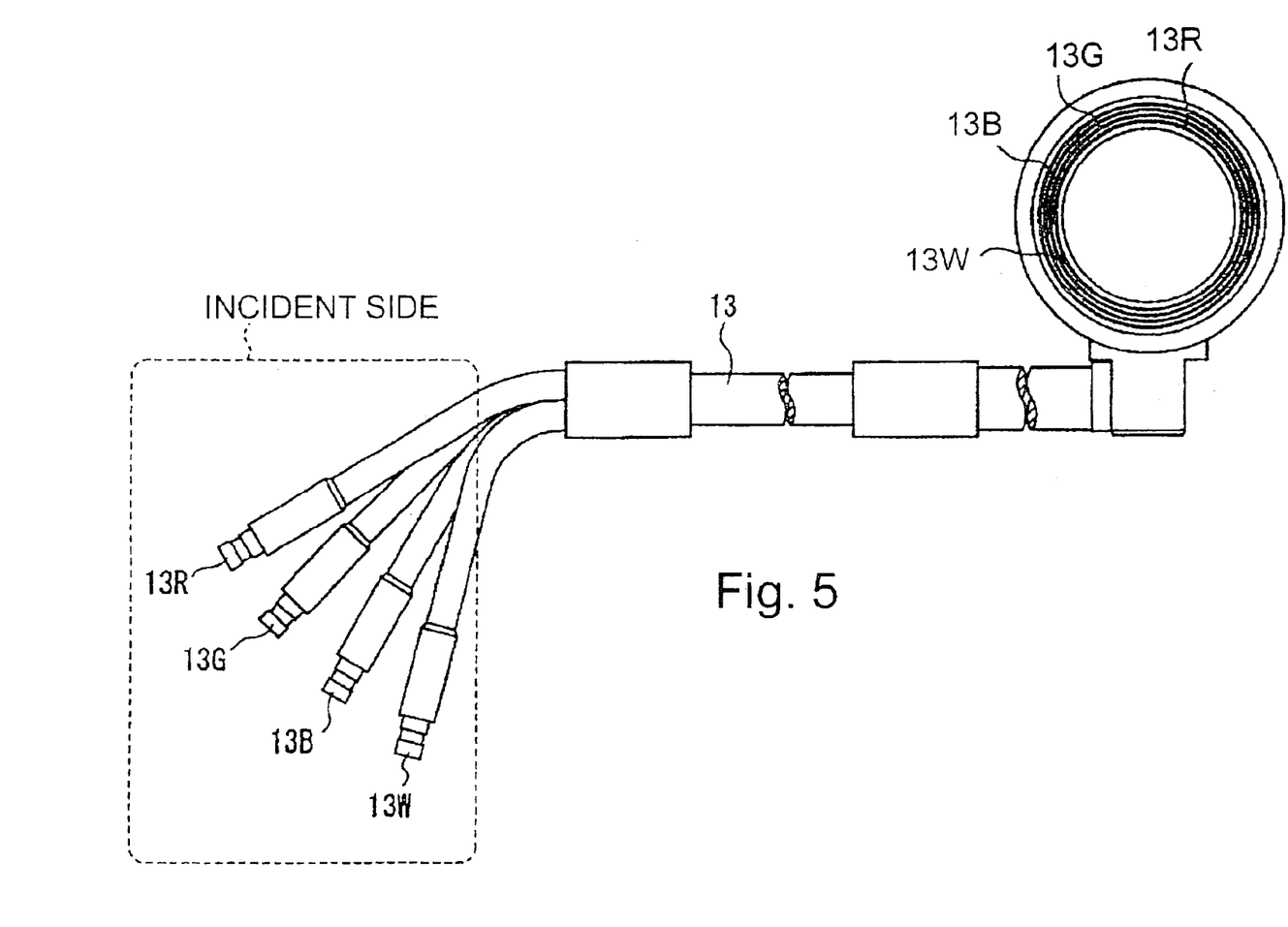
FIG. 5 is a bottom plan view of a third embodiment of the illuminating apparatus according to the present invention.

FIG. 5 shows a third embodiment of the illuminating apparatus according to the present invention. The illuminating apparatus 11 in the third embodiment of the present invention is different from the first embodiment in the arrangement of the light output ends of the optical fibers 13. Namely, groups 13R, 13G, 13B, 13W of optical fibers 13 adapted to output the light of different colors in the third embodiment are arranged in one circle for each color, so that the four circles are concentric. In this embodiment, optical fibers 13 outputting the R (red) light, optical fibers 13 outputting the G (green) light, optical fibers 13 outputting the B (blue or bluish purple) light and optical fibers 13 outputting the W (white) light are arranged in this order from the innermost circle toward the periphery. In such a structure, rings of the optical fibers 13 each outputting the light of different colors 13R, 13G, 13B, 13W are arranged concentrically, so that very bright illumination of an object can be attained.

Figure 6:
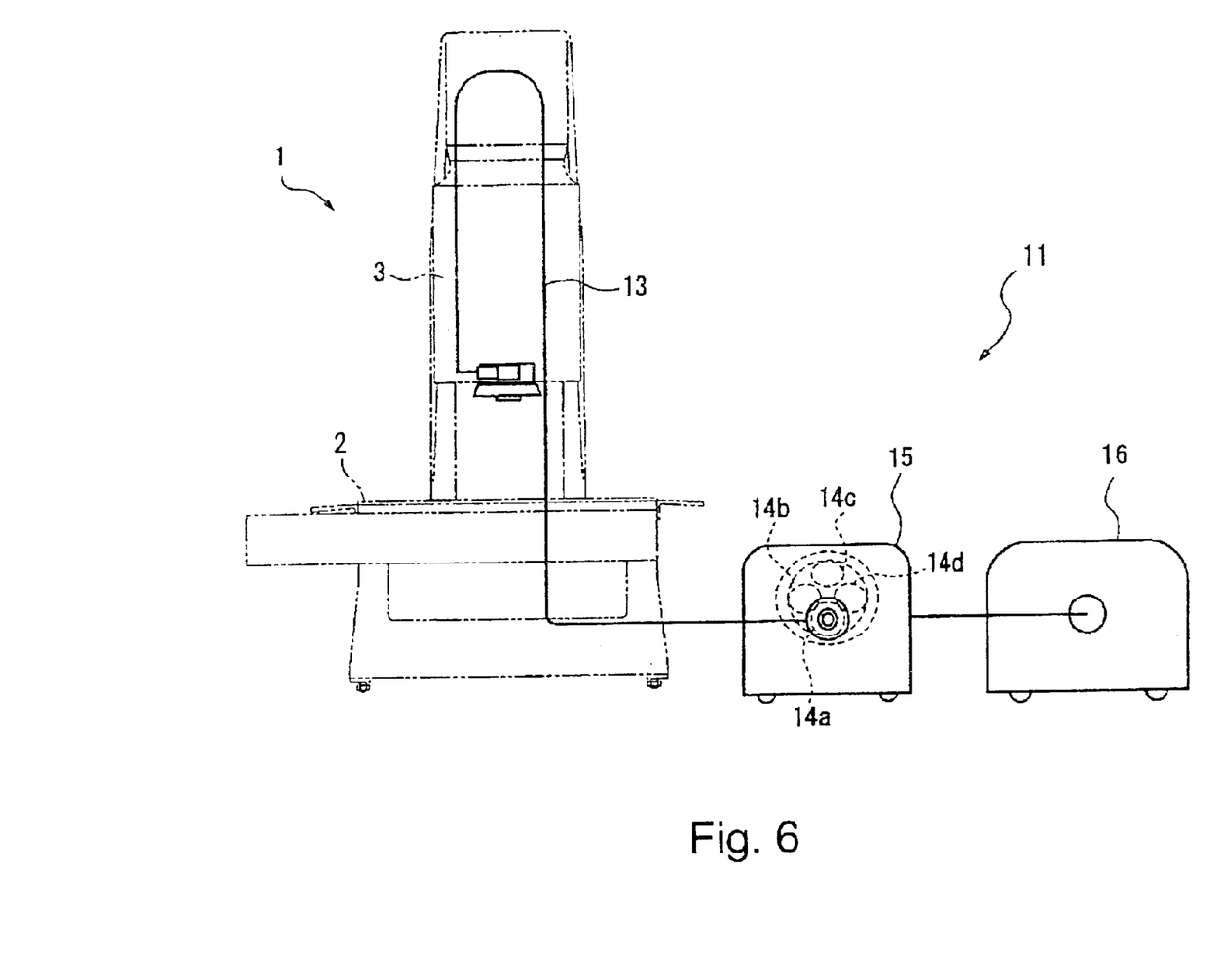
FIG. 6 is a front elevational view showing an image processing type measuring machine to which a fourth embodiment of the present invention is applied.

FIG. 6 shows an image processing type measuring machine using a fourth embodiment of the present invention. The illuminating apparatus of the fourth embodiment is different from the first embodiment in that the incident ends of optical fibers 13 are undivided, and in that a single light source is provided. Namely, the illuminating apparatus of the fourth embodiment is provided with one light source 16, a plurality of optical fibers 13, and a filter change-over unit 15. The optical fibers 13 include an incident end, which receives light from the light source 16, and an output end from which light is output toward the object to be measured. The filter change-over unit 15 is inserted between the light source 16 and the incident ends of the optical fibers, and is adapted to switch filters 14a, 14b, 14c, 14d of a plurality of colors from one to another.

In this embodiment, the color filters 14a, 14b, 14c, 14d provided are R (red), G (green), B (blue or bluish purple) and Y (yellow) filters. When one of the plurality of different color filters 14a, 14b, 14c, 14d is set in front of incident ends of optical fibers 13 by operating the filter change-over unit 15, light of the color of the switched filter is obtained. Moreover, in this structure, one light source 16 serves the purpose, and the optical fibers 13 need not be divided into groups. Therefore, the manufacturing of the illuminating apparatus can be done easily and at a low cost.

In the fourth embodiment, the colors of the filters 14a, 14b, 14c, 14d need not be R (red), green (G), B (blue or bluish purple) and Y (yellow). Rather, filters of other colors may be provided.

Further, if the color filters are made exchangeable, the filters can be changed to filters of colors that the user desires. When any one of these color filters is non-colored, white light can be applied to an object material.

Although the preferred embodiments of the present invention have been described hereinbefore, the invention is not limited to these embodiments. Various kinds of modifications and changes of the design within a range not departing from the scope and spirit of the invention can, of course, be made.

Although, for example, the illumination light of an arbitrary color is obtained in the above-described embodiments by regulating the brightness of the light source, the quantity of the light from a single light source into each of the optical fiber groups 13R, 13G, 13B, 13W may be caused to be different, i.e., the light of an arbitrary color may be obtained by providing, for example, a light-quantity restricting filter or a diaphragm.

Although the incident ends of the optical fibers 13 are divided into four groups in some of the aforementioned embodiments, these incident ends may also be divided into a larger number of groups (five or more), or conversely a smaller number of groups (three). For example, the incident ends of the optical fibers 13 may be divided into five groups, and filters of R (red) color, G (green) color, B (blue or bluish purple) color and one further color may then be inserted.

In the above-described embodiments, the light output ends of the optical fibers 13 are arranged circularly so that the optical axes of the optical fibers 13 converge at an angle on one point. The illuminating apparatus may also be formed so that an angle at which the illumination light is applied to the object to be measured can be varied, by providing the optical fibers in a structure so that the angle of the light output ends thereof can be varied. When the illuminating apparatus is formed in this manner, the light can be applied to an object at an optimum angle with respect to the height and depth of projections and recesses on the object surface.

Although the light output ends of the optical fibers 13 in the above-described embodiments are arranged circularly so that the illumination light is applied from positions around and diagonally with respect to the object to be measured, the illuminating apparatus according to the present invention is not limited to such apparatuses but can be applied to the downward illumination or the transmitted illumination. In the downward illumination or the transmitted illumination, it is desirable that the output ends of the optical fibers outputting the light of different colors be randomly arranged.

The present invention can be applied to not only such an image processing type measuring machine as described in the above embodiments but also some other types of optical measuring machines, such as a microscope, a projector, and a three-dimensional image measuring machine.

There is every reason to expect that the illuminating apparatus for image processing type measuring machines according to the present invention described above can cope with a wide diversity of objects to be measured and enable accurate imaging of an object material, and that the apparatus will rarely be restricted by a space.

What is claimed is:

1. An illuminating apparatus for image processing type measuring machines, said illuminating apparatus applying light to an object to be measured so as to enable determination of a size and shape of the object based upon an image thereby obtained, comprising:

a light source;

a plurality of optical fibers, each of said fibers having an incident end that receives light sent out from the light source and an output end that outputs light toward the object, said optical fibers being divided at their incident ends into at least three groups; and filters of a red color, a green color and a blue color inserted between the divided incident ends of each of the optical fiber groups and the light source;

wherein the output ends of the optical fibers are arranged annularly at an angle so that optical axes of the optical fibers converge on one point and the output ends of all optical fibers of one color are positioned in a predetermined divisional section of a circle.

2. An illuminating apparatus for image processing type measuring machines, said illuminating apparatus applying light to an object to be measured so as to enable determination of a size and shape of the object based upon an image thereby obtained, comprising:

a light source;

a plurality of optical fibers, each of said fibers having an incident end that receives light sent out from the light source and an output end that outputs light toward the object, said optical fibers being divided at their incident ends into at least three groups; and filters of a red color, a green color and a blue color inserted between the divided incident ends of each of the optical fiber groups and the light source;

wherein the output ends of the optical fibers are arranged annularly at an angle so that optical axes of the optical fibers converge on one point and the output ends of all optical fibers of each color are positioned in one circle, and wherein the circles of the different colors are concentric with one another.

3. An illuminating apparatus for image processing type measuring machines, said illuminating apparatus applying light to an object to be measured so as to enable determination of a size and shape of the object based upon an image thereby obtained, comprising:

a light source;

a plurality of optical fibers, each of said fibers having an incident end that receives light sent out from the light source and an output end that outputs light toward the object, said optical fibers being divided at their incident ends into at least three groups; and filters of a red color, a green color and a blue color inserted between the divided incident ends of each of the optical fiber groups and the light source;

wherein said light source comprises separate light sources corresponding to each optical fiber group so that a brightness of light from each light source can be regulated, the output ends of the optical fibers are arranged annularly at an angle so that optical axes of the optical fibers converge on one point, and the output ends of all optical fibers of one color are positioned in a predetermined divisional section of a circle.

4. An illuminating apparatus for image processing type measuring machines, said illuminating apparatus applying light to an object to be measured so as to enable determination of a size and shape of the object based upon an image thereby obtained, comprising:

a light source;

a plurality of optical fibers, each of said fibers having an incident end that receives light sent out from the light source and an output end that outputs light toward the object, said optical fibers being divided at their incident ends into at least three groups; and filters of a red color, a green color and a blue color inserted between the divided incident ends of each of the optical fiber groups and the light source;

wherein said light source comprises separate light sources corresponding to each optical fiber group so that a brightness of light from each light source can be regulated, the output ends of the optical fibers are arranged annularly at an angle so that optical axes of the optical fibers converge on one point, and the output ends of all optical fibers of each color are positioned in one circle, and wherein the circles of the different colors are concentric with one another.

* * * * *